(12) United States Patent
Gottemukkula

(10) Patent No.: US 12,743,509 B1
(45) Date of Patent: Sep. 22, 2026

(54) SPOOF DETECTION USING REINFORCEMENT LEARNING TO GENERATE IMPROVED TRAINING DATA

(71) Applicant: Jumio Corporation, Sunnyvale, CA (US)

(72) Inventor: Vikas Gottemukkula, Alexandria, VA (US)

(73) Assignee: Jumio Corporation, Sunnyvale, CA (US)

( * ) Notice: Subject to any disclaimer, the term of this patent is extended or adjusted under 35 U.S.C. 154(b) by 195 days.

(21) Appl. No.: 18/193,760

(22) Filed: Mar. 31, 2023

(51) Int. Cl.
*G06F 21/56* (2013.01)
*G06N 20/00* (2019.01)

(52) U.S. Cl.
CPC ............. *G06F 21/56* (2013.01); *G06N 20/00* (2019.01); *G06F 2221/034* (2013.01)

(58) Field of Classification Search
CPC .... G06F 21/56; G06F 2221/034; G06N 20/00
See application file for complete search history.

(56) References Cited

U.S. PATENT DOCUMENTS 10,839,268 B1 * 11/2020 Ardulov .................. G06N 5/04
11,334,755 B1 5/2022 Joshi et al.
11,341,225 B1 * 5/2022 Joshi ...................... G06V 40/40
11,341,778 B1 5/2022 Joshi et al.
2018/0130230 A1 * 5/2018 Nakajima .......... G06V 10/7515
2020/0117582 A1 * 4/2020 Srivastava .......... G06F 11/3684
2020/0175260 A1 * 6/2020 Cheng ...................... G06T 7/50
2020/0320428 A1 * 10/2020 Chaloulos ............. G06N 20/00
2021/0110018 A1 * 4/2021 Rowe .................. G06V 10/764
2021/0248401 A1 * 8/2021 Timoshenko .......... G06V 40/40
2022/0156376 A1 * 5/2022 dos Santos Silva .. G06F 21/554
2022/0303290 A1 * 9/2022 Baidya ................ H04L 63/1441
2022/0414663 A1 * 12/2022 Anthony ............ G06Q 20/4016
2023/0297672 A1 * 9/2023 Watson ................ G06F 21/554 726/23
2023/0306786 A1 * 9/2023 Chanchlani ............... G06T 7/73
2023/0315851 A1 * 10/2023 Wei ........................ G06N 5/022 726/23

FOREIGN PATENT DOCUMENTS

GB 2607496 A * 12/2022 .......... B29C 64/393

* cited by examiner

*Primary Examiner* — Sheweye Gelagay
*Assistant Examiner* — Samikshya Poudel
(74) *Attorney, Agent, or Firm* — Patent Law Works, LLP

(57) ABSTRACT

The disclosure includes a system and method for spoof image detection. A spoof detection model is trained based at least in part on spoofed images and/or videos generated by a spoof agent. The spoof agent is trained using a reinforcement learning algorithm that is rewarded for successfully fooling the spoof detection model. Thus, the spoof agent learns to improve its abilities to fool the spoof detection model, while the spoof detection model learns to become better at detecting spoofing.

20 Claims, 13 Drawing Sheets

SPOOF DETECTION USING REINFORCEMENT LEARNING TO GENERATE IMPROVED TRAINING DATA

BACKGROUND

The present disclosure relates to verification of identity. More specifically, the present disclosure relates to identity confirmation or verification.

Entities, such as governments, businesses, and individuals, may seek to confirm an identity of a person for any number of reasons including: to protect information or digital assets (e.g., bank accounts, password manager accounts, etc.), to protect physical assets (e.g., doors, vaults, borders, etc.), to comply with laws and regulations (e.g., anti-money laundering or other banking regulations), or other reasons. To confirm an identity, a comparison is often made between an attribute (e.g., face) of the person present and a reference documentation associated with that attribute (e.g., photo ID showing the person's face).

Identity authentication sometimes consider many types of different information to attempt to identify identity fraud. However, detecting spoofed identity information is important in many authentication systems. Unfortunately, fraudsters have become extremely skilled at using spoofing techniques to generate fake facial images. Fraudsters also attempt to fake other types of identification information, such as information used to generate fingerprints, palmprints, eyeprints, and eye iris information.

Fraudsters may expend considerable time, energy, and ingenuity to attempt to create spoofs that defeat conventional spoof detection algorithms. This creates potential vulnerabilities in a wide variety of user authentication systems. Liveness is critical for many types of biometric authentication. Unfortunately, creating spoof training data to improve spoof detection models is tedious and requires a niche skill set.

SUMMARY

An apparatus, system, and method is disclosed for spoof detection using reinforcement learning to generate training data. An example of a computer system includes a spoof detection machine learning model trained to detect spoof attempts based at least in part on training data generated by a spoof agent having a reinforcement learning model in which the spoof agent is rewarded for generating simulated attempted spoofing attacks that fool the spoof detection machine learning model. In some implementations, the spoof detection machine learning model is trained iteratively with the spoof agent utilizing reinforcement learning to improve its ability to train the spoof detection model. In some implementations, the spoof detection machine learning model comprises a neural network model, such as a convolutional neural network (CNN) model. In some implementations, the spoof agent selects a robotic arm position of a six degrees of freedom (6 DOF) robotic arm. In some implementations, the spoof agent selects a lighting condition for capturing a spoofed image. In some implementations, the simulated attempted spoofing attacks are based on at least one of paper-based attacks, screen-based spoof attacks, and three-dimensional image spoof attacks. In some implementations, spoof detection machine learning model utilizes an additional agent to aid in selecting samples to attempt to exploit at least one potential bias of the spoof detector.

An example method includes a computer implemented method, including generating simulated attempted spoof attacks by a spoof agent of a spoof detection model. The method includes Identifying successful and unsuccessful spoof attempts of the spoof detection model by the spoof agent. The method includes utilizing results of the simulated attempted spoof attacks as a source of training data for the spoof detection model and retraining the spoof detection model. The method further includes generating a reinforcement learning reward for the spoof agent successfully fooling the spoof detecting machine learning model, whereby the spoof agent learns to adapt its spoof attempts.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The present disclosure is described in the context of training a spoof detector to detect spoofing attacks, and which may in some implementations be deployed in a fraud detector for detecting identity fraud; however, those skilled in the art should recognize that the trained spoof detector may be applied to other environments and use cases without departing from the disclosure herein.

Figure 1A:
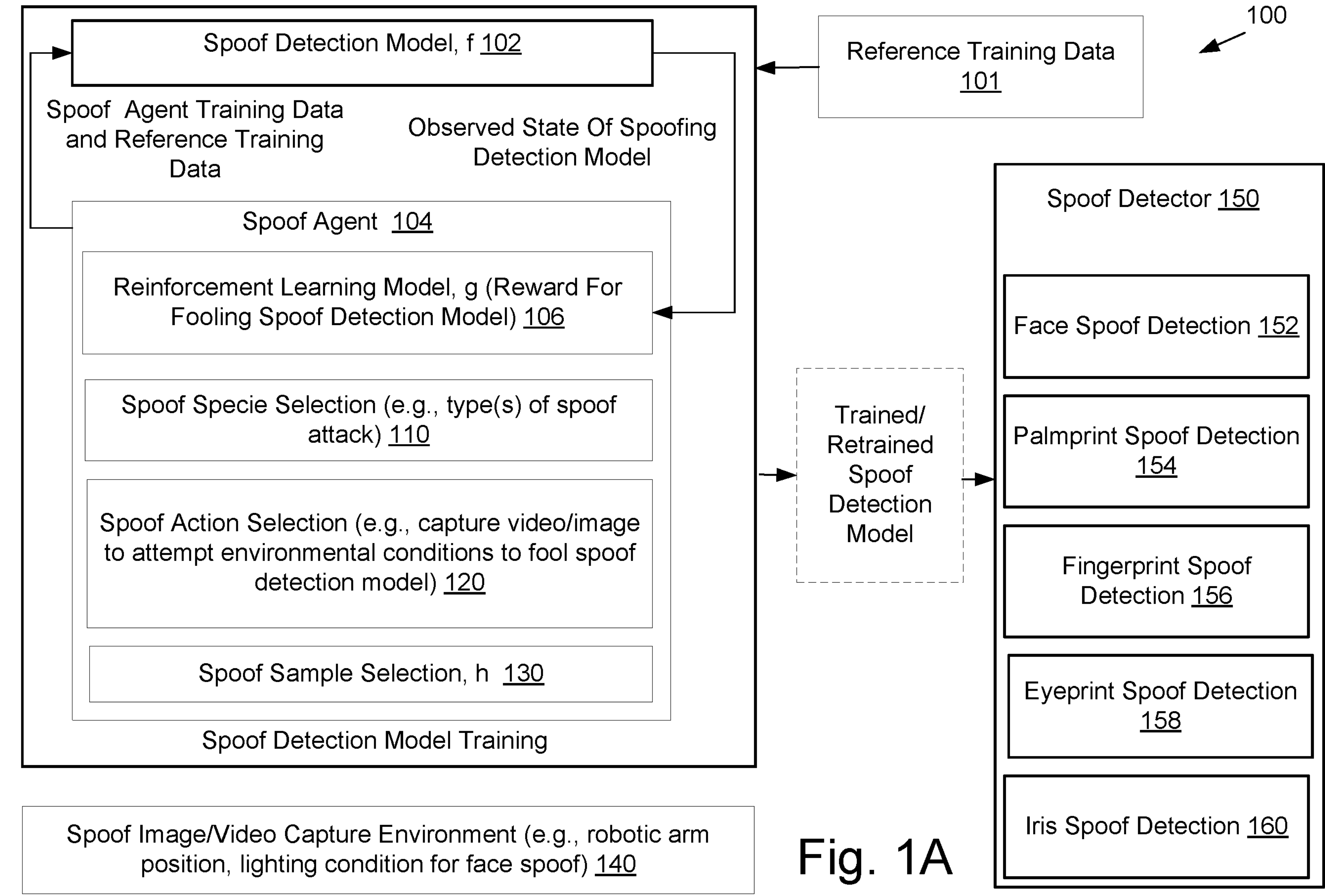
FIG. 1A is a block diagram of one example implementation of a system for generating training data to train a spoof detection model in accordance with some implementations.

FIG. 1A illustrates a general illustration of a spoof detector 150 that has a spoof detection model, f, 102 trained to detect attempted spoof attacks. The spoof detector 150 may, for example, be instantiated as computer program instructions running in a server. In one implementation, a spoof detector includes a machine learning model trained using a combination of reference training data 101 and additional training data generated by a spoof agent 104. The reference training data 101 may, for example, include in one implementation labelled training data of spoofed and non-spoofed data examples. The spoof detector 150 may for example, use a machine learning model such as a neural network, such as a convolutional neural network (CNN) or a deep learning neural network.

The spoof agent 104 generates simulated attempted spoof attacks on the spoof detection model 102. The results of the simulated attempted spoof attacks can be used to generate training data for the spoof detection model 102. For example, a successful simulated spoof attack can be used to generate labelled training data. Similarly, an unsuccessful simulated spoof attempt can also be used to generate labelled training data.

In one implementation, the spoof agent 104 includes a reinforcement learning model, g. The reinforcement learning model 106 observes the state and takes actions in response to create simulated attempted spoofing attacks and receive a reward for a successful simulated spoofing attack of the spoof detection model 102. That is, the spoof agent 104 takes actions to generate simulated attempted spoof attacks, which are input to the spoof detection model 102. The results of attempted simulated spoof attacks may, for example, be explicitly or implicitly labelled by the spoof agent as being spoof training data. Additionally, in one implementation the spoof agent utilizes reinforcement learning to learn how to spoof the spoof detector. With reinforcement learning, the spoof agent 104 can learn to spoof. While the spoof agent may be implemented in different ways, in some implementations, the spoof agent is implemented to include a neural network model. As an implementation detail, the spoof detection model 102 and spoof agent 104 may be implemented on a computing device, such as on a computer server.

Regarding the spoof agent 104, an observation is made whether the spoof agent 104 successfully spoofed the spoof detection model 102. A reward is generated for the spoof agent 104 for successfully fooling the spoof detection model 102. As a result, the spoof agent 104 learns how to spoof in the sense that it improves its capability to fool the spoof detection model 102 in simulated attempted spoofing attacks. As a result of the reinforcement learning, the spoof detection model 102 receives improved simulated attempted spoof attacks from the spoof agent 104, the results of which in turn are used to generate improved training data for the spoof detector 102 to detect spoofing attacks.

In some implementations, an iterative process is performed. For example, in a first iteration, the spoof agent 104 may generate a first set of attempted simulated spoof attacks. A first round of reinforcement learning is performed by the spoof agent 104 to collect simulated spoof attacks. The first round of simulated spoof attacks may also be used as training data to improve the spoof detection model 102. The process may then be repeated again iteratively until some pre-determined criteria is satisfied (e.g., a convergence criterion, cost considerations, a maximum number of iterations is performed, or some other criteria).

In one implementation, the spoof agent 104 includes a spoof specie selection module 110 to select the spoof specie the spoof agent 104 utilizes in its simulated attempted spoof attacks. For example, for facial spoofing, a variety of different spoofing attacks are known, such as using facial images on computer screens, facial videos on computer screens, facial images printed on a paper, and three-dimensional (3D) printed faces (e.g., mask-like or statue-like 3D face). However, other spoof species could be selected. There are also a variety of different types of spoofing that the technique could be applied to, such as for training a spoof detection model for a spoof detector 150 having one or more of face spoof detection 152, palmprint spoof detection 154, fingerprint spoof detection 156, eyeprint spoof detection 158, and iris spoof detection 160.

In one implementation, the spoof agent 104 selects actions to implement simulated spoof attacks. This may include, for the case of spoofing a face, a camera capturing under different lighting conditions in an image/video capture environment 140. However, more generally, the spoof action selection may include selecting a reference (starting/initialization) location for capturing an image of a particular spoof species, and when applicable, selecting a lighting condition.

Figure 1B:
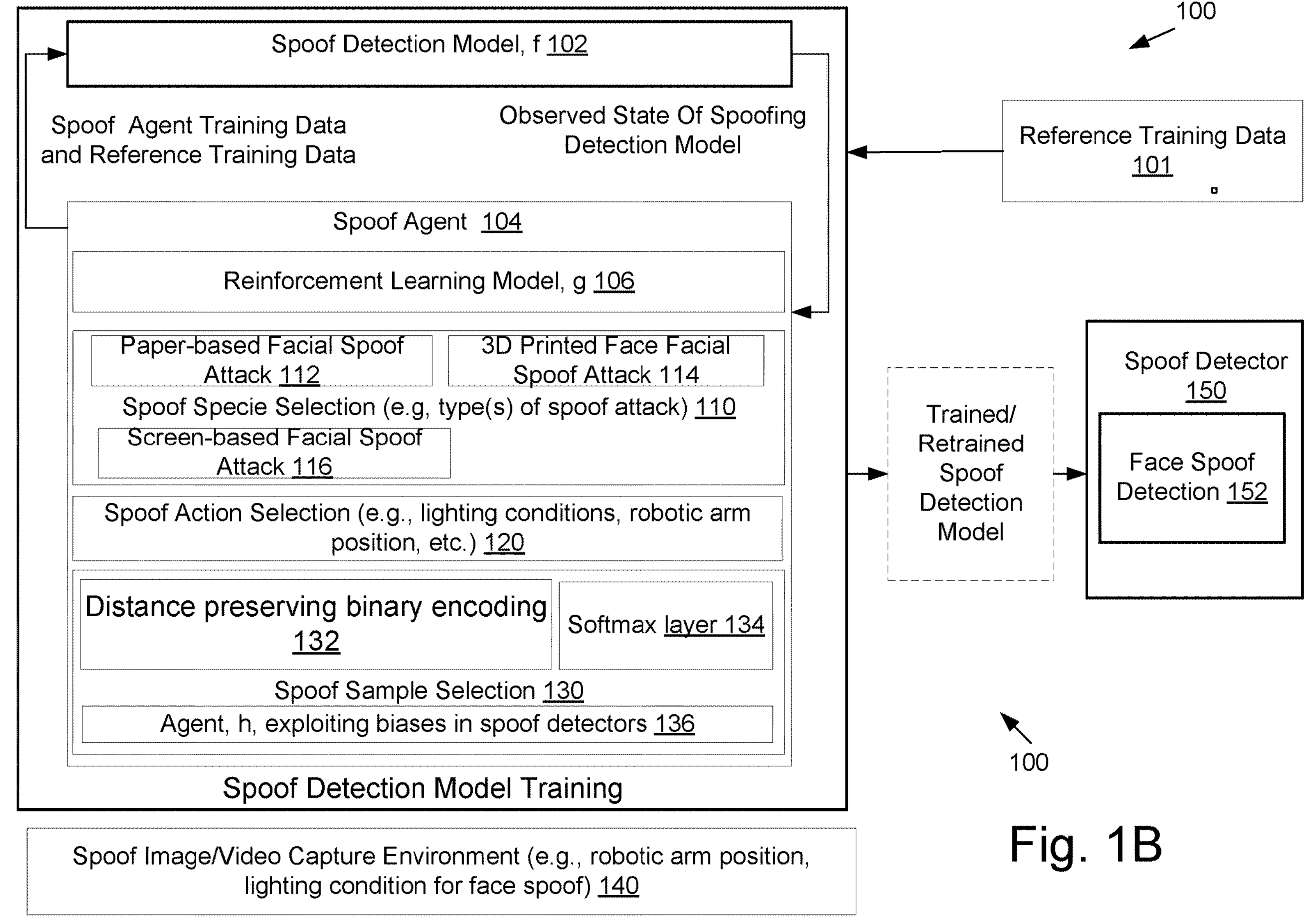
FIG. 1B is a block diagram of one example implementation of a system for generating training data to train a spoof detection model in accordance with some implementations.

FIG. 1B illustrates an example for face spoof detection in which the spoof specie selection includes paper-based facial spoof attacks 112, a 3D printed face facial spoof attack 114, and a screen-based facial spoof attack 116. FIG. 1B also illustrates examples of spoof sample selection algorithms that may be used, such as using a distance preserving binary encoding 132, a SoftMax layer 134, and optionally using an additional agent, h, that attempts to exploit potential biases in spoof detectors, such as a potential gender bias, an ethnic bias, an age bias, etc.

Spoof Detection Model and Spoof Agent Reinforcement Learning Model

As an illustrative but non-limiting example, the spoof detection model 102 may be based on a differentiable spoof detection algorithm, f(.), in which the objective of the spoof detection model is to distinguish between detecting a live human being versus a spoof attack, where $f(I^{live})=1$ and $f(I^{SPOOF})=0$.

The spoof agent 104 may be trained using a reinforcement learning algorithm, g(.). Essentially, f detects if the user in the captured image/video is live ($I^{live}$) or spoof ($I^{spoof}$). The task of the spoof agent 104, g, is to capture an image/video, $I^{spoof}$, to fool f to earn a reward.

In some implementations, the actions taken by g can include controlling a robotic arm, a lighting condition, and/or the samples of each species used for a simulated attempted spoof attack. For example, in one implementation using the camera (e.g., a web camera, smartphone, RGB-IR, RGB-D (RGB depth) etc.) attached to a robotic arm permits initialization and then varying the location relative to a reference location. The lighting conditions may also be varied until the spoof agent identifies parameters in which $f(I^{spoof})=1$, essentially, fools f in order to earn a reward. The spoof agent, g, continuously learns to improve how it captures images to fool f.

It should be noted that the 0 and 1 for spoof and live are used for simplicity. However, since f is not a binary classifier, determining whether the image was captured live or was a spoof may be based on a threshold. For example, suppose f considers an image, I, as live if $f(I) \geq$ threshold. The threshold may be selected to correspond to a high confidence that an image is live.

In one implementation, the threshold for f may be selected as an implementation detail. For example, in some end-use applications a high confidence score that an image is live is desired but the required corresponding confidence may depend on the end-use application, as well as whether there are other factors associated with liveness in addition to the image itself. Also, the reward function for the reinforcement learning model 106 may also be varied as an implementation detail.

In one implementation, an iterative approach is used for the process. For example, in an iterative process, when the system collects a certain number of robotic spoof samples that are considered to be live by the spoof detection model, f, the neural network model of the of the spoof detection model f is trained (finetuned) offline with both reference data and robotic spoof samples before the next set of robotic spoof samples are collected.

Various optimizations are possible. Having spoof agent 104 learn (using a reinforcement learning algorithm), g, completely from scratch is expensive. As such, in one implementation, a subset of samples are used to capture images/videos to create a synthetic training environment that is used to pre-train the spoof agent 104, g, which is later used in the above process. For example, for facial images, a subset of samples may be used for pre-training, such as a subset of all possible robotic arm locations and lighting conditions.

In some implementations, the system can be trained for one or more spoof species. For example, for spoofing a face, the spoof specie can be a paper-based attack, a screen-based attack, and/or more sophisticated 3D spoofs, such as 3D printed faces.

As an example of screen-based attacks, an image or video may be displayed on a monitor, smartphone, tablet and/or television. In certain cases, an image or video is projected on a screen or a 3D mannequin. As an example, a change of the image or video for a facial spoof can be performed as an action taken by the spoof agent. For example, the spoof agent may be provided with options for the images/videos to be displayed, as well as for actions such as changing a location (that is different from reference location) of the camera, changing lighting conditions, etc.

As an example of paper-based attacks, an image can be printed on regular and/or photo quality paper (e.g., matte and/or glossy) using inkjet and/or laser-jet printers. In one implementation, a switch of papers (by a mechanical enclosure) can be done as an action selected by the spoof agent. For example, a mechanical enclosure/fixture could be implemented to automatically load/unload a paper-based specie. As an example of a paper-based attack, face cutouts of a face after printing on paper are challenging samples because the paper can be bent to increase its ability to fool a spoof detector. Bending a face cutout reduces unnatural reflections and avoids borders. However, a mechanical enclosure is required to bend a facial cutout. For example, a special mechanical or robotic assembly may be required to load/unload a paper-based specie and apply a controlled bend to a facial cutout. As an illustrative but non-limiting example, there could be 4 controlled bends (no bend, slight bend, medium bend, or high bend).

As an example of 3D attacks, a 3D printed face, silicone face mask and/or plaster of Paris face mask may be created to spoof the system. In certain cases, these faces can be painted to be more realistic. As previously discussed, in certain cases, an image can be projected onto part or all of a 3D printed face to attempt to make it appear to be more realistic.

In some implementations, environment lighting can have different possible configurations in terms of the number of light sources, direction(s) of the light source(s), intensity of the light source(s), and color of the light (e.g., the color spectrum of each light source). For example, different light sources may be used, such as LED light sources, fluorescent lamps, and light bulbs. The environment lighting also has a reference distance relative to a robot arm coordinate system, which may need to be taken into account given the divergence properties of a given light source and any optical diffusers used with a particular light source. For example, a bare light fixture will illuminate a spoof specie differently than if it has a lamp shade or a lamp diffuser.

In one implementation, at least six different warm light sources (back, left, right, front, top and bottom directions are relative to the presented spoof sample) are used with N levels of brightness/intensity (0 . . . N, where 0 is off and N is the highest intensity, where as an example, N might be 3, corresponding to off, low, medium, and high brightness). In one implementation, a highest intensity is relative to the maximum expected lux by the camera given the environment and light sources. As an example, the highest intensity can correspond to a brightness of the outdoors or a well-lit environment.

In the most general case, there may be many variations in the number of light sources, directions, intensity, and color spectrum of each light. The distance of the light source from the spoof specie is another variable. Other possibilities include adjusting natural light sources, such as through the use of remote-controlled window blinds at different directions. However, more generally there may be other variations in environmental lighting, including the potential use of flash lighting, such as a flash on a camera or a flash in other locations in the environment.

For implementations in which a robotic arm is used, the reference location of the robotic arm may be varied to adjust the distance and orientation of a camera. A robotic arm with multiple degrees of freedom (DOF) can be used to hold the camera. However, a 6 DOF robotic arm is preferred. A robotic arm with 6 DOF facilitates capturing images at a large number of different locations. A high precision 6 DOF robotic arm permits a large number of different locations to be accurately sampled. The distance and orientation of the camera location on the 6 DOF robotic arm with respect to the spoof specie sample can be defined using the x, y, z, roll, pitch and yaw of the robotic arm, although more generally other coordinate systems and nomenclatures could be used.

The positions of the robotic arm in 3D space are limited to the locations where the camera can capture the images desired by f. As an example, for the case of mobile face recognition software, at least a certain percentage of the face must be in the captured image and have a minimum face area given the image resolution and face captured in the image/video must have pitch, roll and/or yaw typically within ±15°. In one implementation, a position is valid if the robotic arm can capture a valid image for all the samples within the test set. Alternatively, the 3D space limitation can be removed by invalidating the reward when the captured image does not meet the required criteria, however, this will add complexity to the reinforcement learning algorithm.

In the case of 6 DOF robotic arm, the x, y, z, roll, pitch and yaw of the robotic arm are relative to the reference location. The reference location is defined such that:

1) The center of spoof specie (screen, paper or 3D mask) is on the camera's optical axis;
2) The yaw, roll and pitch of the spoof specie (screen, paper or 3D mask) are zero in picture captured at the reference location; and
3) The interocular distance (IOD) in pixels is within a range and/or a constant value (the range or constant value is varied with camera). Alternatively, one can use a face width or height.

In any given episode, the robotic arm with the camera starts at the reference location. The reference location is the best for initialization; however, it may not be the best location for fooling the spoof detection model. During an episode, the location is varied several times to find the best location for spoofing given the spoof sample.

In one implementation, actions selected by the spoof agent are divided into three parts: 1) robotic arm, 2) lighting condition, and 3) sample selection. Each of these actions will now be considered. In one implementation, for any given state the robot arm can retain the previous value or change by a unit in positive or negative direction for each of the x, y, z, roll, pitch and yaw. Essentially, the agent can take one of the three possible actions per a degree of freedom. As such, in this example, the robotic arm can move to one of 729 ($3^6$) possible locations. However, in the case where the position of the robotic arm is limited to locations where it can capture a valid image/video, the possible actions can get down to two per a degree of freedom (either retain the previous value and change by a unit in positive direction or retain the previous value and change by a unit in negative direction).

In one implementation, any given state the intensity of each light source is controlled by the spoof agent. As an example, consider that four different light sources (left, right, front, and top directions relative to the presented spoof sample) are used with 2 levels of brightness/intensity (0 . . . 1, where 0 is off and 1 is on). In one implementation, spoof agent can take two possible actions (on/off) for each light source. However, more generally, each light source could have an integer positive number M, of different possible lighting settings.

Other parameters could also, in theory, be selected by the spoof agent. For example, if a given camera supports variations in camera settings, then in one implementation this is another variable that could be adjusted. For example, a camera may have a selectable flash setting, exposure setting, shutter speed, f-stop setting, ISO etc.

It will also be understood that variations on individual spoof specie (e.g., a screen image of a face) may in some implementations be selected as an action by the spoof agent. For example, using image processing techniques, many variations of a screen image of a face may be selected, such as creating a screen image of the same basic face with different skin tones, changing aspects of the same face related to aging, such as adjusting a degree of wrinkling, changing hair color and graying, as well as numerous other possible variations of a face. For the case of a 3D mask/statue having at least a portion of the mask/statute illuminated with a projected image, in some implementations, the spoof agent could select variations in the projected image. For the case of a paper spoof, if a mechanical fixture supports controlled bending, the spoof agent could control the degree of bend. Also, for the case of a paper spoof, in some implementations, the spoof agent could potentially also control selections of printing details of the paper spoof, such as selecting paper specie printed with different skin tones as one of many examples.

In other words, while a basic implementation for facial images has a reference location of a robot arm and lighting conditions as actions selectable by the spoof agent, in some implementations the spoof agent may also control various aspects of the spoof specie sample selection.

While a single robotic arm is a preferred implementation to vary a reference location, it is noted that more complicated setups could be used to generate similar control over distances and orientation, such as using two or more different robotic arms. That is, there may be more complicated or more expensive apparatus that produces an equivalent result.

In the implementation, the selection of a spoof sample by the spoof agent can be done in two ways. First, a SoftMax layer can be used to compute the probability of the sample to be used. Second, a distance preserving binary encoding of the embedding can be used (e.g., from a biometric recognition algorithm) to minimize action space.

However, a disadvantage of changing the spoof sample by agent, g, is that it requires a large action space to accommodate a variety of samples, which is not practical when dealing with large datasets. Alternatively, the agent will get N attempts to spoof a given sample. In one implementation, such scenario can have higher rewards for near perfect scores, $f(I^{spoof})\approx 1$, when compared to the uncertain score. Furthermore, the rewards per capture can also be accumulated to score the algorithm after N attempts (e.g., rewards per episode, like a game).

In one implementation, where the algorithm gets N attempts to spoof, a different agent, h(.), can select the gender, ethnic group (alternatively, skin tone or country/continent of origin may be used) and/or age group of the spoof sample (the sample within the sub-group can be random). The agent, h, may be implemented using a neural network model. As an example, suppose the agent, h, gets to pick the samples from Hispanic Females of ages 46-50. However, this action is only possible once for an episode (N attempts). This allows h(.) to exploit potential unintentional biases in a spoof detector, f(.). For example, it might hypothetically be the case that the spoof detector f, has an unintentional bias that a fraudster might attempt to exploit in making spoof attacks. The agent h may select spoof samples to attempt to address these types of issues.

Reinforcement Learning Algorithm (g/h) Examples

As previously discussed, the rewards are computed using the spoof detection model 102 f(.). In one implementation, model-free deep reinforcement learning algorithms can be used to train g(.) and h(.). The reinforcement learning algorithms used to train the agent, g(.) may be based on conventional reinforcement learning techniques, including model-free on-policy and model-free off-policy algorithms. Some examples of model-free on-policy reinforcement learning algorithms include (but are not limited to) vanilla policy gradient (PG), proximal policy optimization (PPO) and model-agnostic meta-learning (MAML). Some model-free off-policy reinforcement learning algorithms include (but not limited to) Deep-Q-Learning (DQN), Recurrent Replay Distributed DQN (R2D2) and Soft Actor Critic (SAC).

A benefit of using reinforcement learning is that the use of reinforcement learning can deliver a spoof detector 150 (a neural network) that is extensively evaluated and trained on edge cases. One of the problems in detecting spoofing is that fraudsters exert incredible effort in their spoofing attacks. Also, there are multiple fraudsters. It's difficult, costly, and time consuming for a human user to identify all possible edge cases and generate labeled training data for all possible edge cases. However, the use of reinforcement learning provides an automated technique to train a spoof agent 104 to become better at spoofing using reinforcement learning, and consequently, the spoof agent becomes better at generating training data for edge cases to train a spoof detector to detect edge cases.

Different Spoofing Applications

Various applications of the basic technique may be applied to spoofed facial images and to other types of spoofing. In some of these applications, the reference location may also be based on the location of the robot arm with respect to the spoof specie sample, with minor variations depending on the spoof type.

Palmprint biometrics use Red-Green-Blue (RGB) cameras, RGB-IR (RGB infrared) cameras or RGB-D (RGB depth) cameras. Implementations of the technique described in this application can be applied to improve spoof detection algorithms for palmprint based biometrics with a change of reference location of the robot arm. Essentially, for a palmprint the reference location is defined such that the center of the spoof-specie (palmprint presented on a screen, palmprint presented on a paper, or a 3D palmprint) is on the camera's optical axis. The yaw, roll and pitch of the spoof specie (screen, paper or 3D palmprint) are zero in pictures captured at the reference location. The width of the palm in pixels is within a range and/or a constant value (the range or constant value is varied with camera).

Fingerprint biometrics using RGB cameras, RGB-IR cameras, or RGB-D cameras have the reference location defined such that:

1) the center of the spoof-specie (finger presented on a screen, finger presented on a paper or 3D finger) is on the camera's optical axis;
2) The yaw, roll and pitch of the spoof specie (screen, paper or 3D mask) are zero in pictures captured at the reference location; and
3) The width of the finger in pixels is within a range and/or a constant value (the range or constant value is varied with camera).

Eyeprint ID may use RGB, RGB-D or RGB-IR cameras. An Eyeprint ID extracts eye crops from an entire face capture. As such, it may use a technique in which the reference location is the same as the facial spoofing reference location. RGB-D cameras can be used as is. RGB-IR cameras may need additional IR light sources in addition to the proposed visible light sources.

Iris recognition using RGB, and/or IR cameras, or RGB-IR cameras is another option. Iris recognition extracts eye crops from entire face capture. This technology can be applied using IR lights and/or visible wavelength lights.

Implementation Examples

Figure 2:
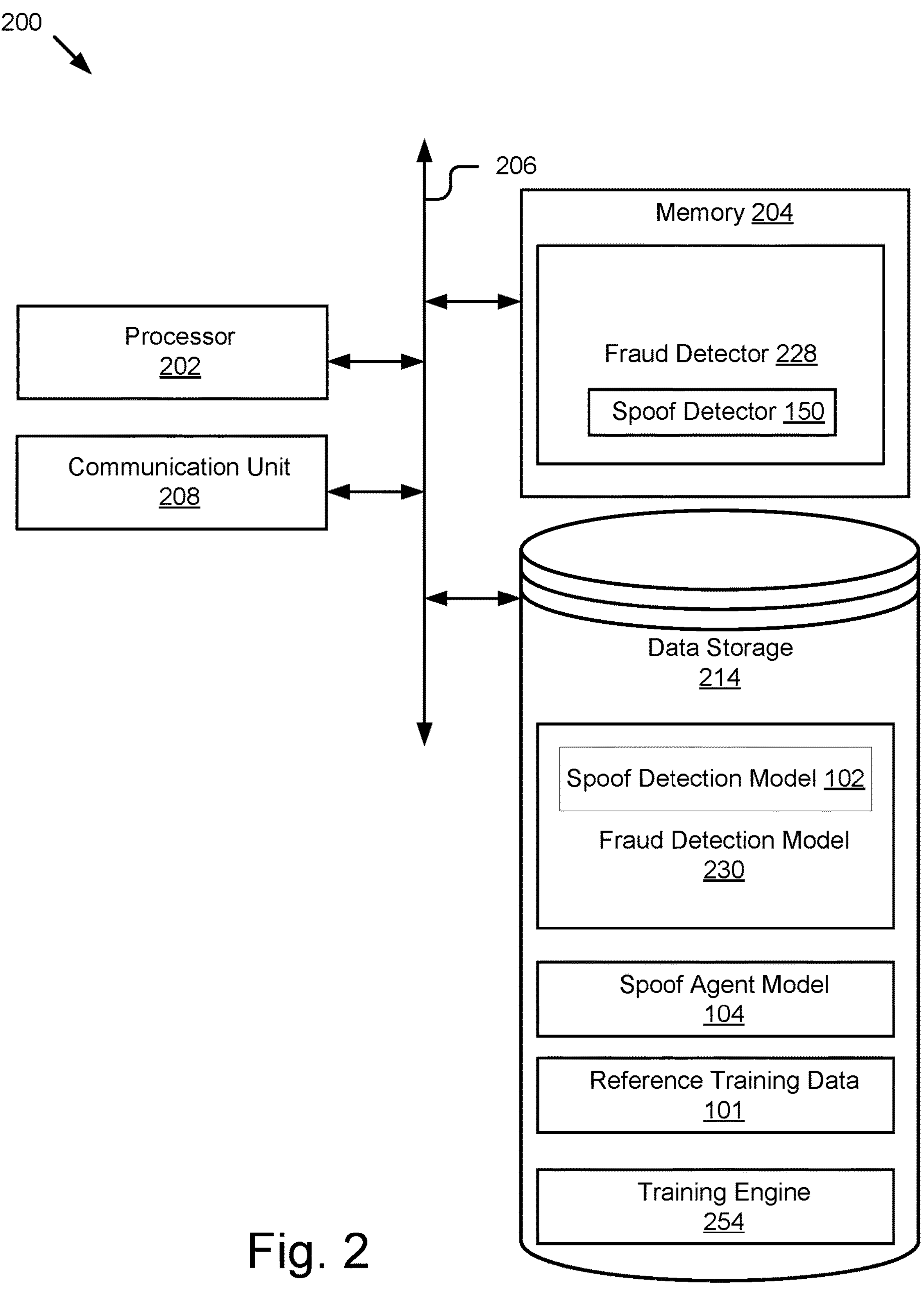
FIG. 2 is a block diagram of an example computing server device implementation in accordance with some implementations.

Referring to FIG. 2, in some implementations, fraud detection may include determining if a live human being submitted a photo, fingerprint, palmprint, faceprint, Eyeprint or iris. That is, a determination is made whether an image corresponds to a live image or a spoofed image. An overall fraud detector 228 may be implemented using a variety of machine learning techniques, including supervised learning, unsupervised learning, semi-supervised learning, etc. Additionally, the fraud detector 228 may include more than one type of model to address different potential fraud threats. Also, a fraud detector 228 may take into account other sources of informative indicative of liveness in combination with information from a spoof detector. That is, a spoof detector 150 may be one aspect of a fraud detector 228.

The fraud detector 228 may be implemented on a computing device such as a server 200, although more generally it could be implemented in other parts of the system 100 as well. FIG. 2 is a block diagram of an example computing device 200 including an instance of the fraud detector 228. In the illustrated example, the example computing device 200 includes a processor 202, a memory 204, and a communication unit 208. It may also optionally include a display and a user interface device.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the fraud detector 228.

The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

A data storage 214 may store data related to the fraud detector 228. For example, depending on implementation details, it may include reference training data 101 and a training engine 254 for retraining the spoof detection model 102 and a fraud detection model 230. A spoof agent model 104 may be provided for training a spoof detection model on edge cases.

The communication unit 208 is hardware for receiving and transmitting data by linking the processor 202 to a network and other processing systems. The communication unit 208 receives data and transmits the data via a network. The communication unit 208 is coupled to the bus 206. In one implementation, the communication unit 208 may include a port for direct physical connection to the network or to another communication channel. For example, the computing device 200 may be the server, and the communication unit 208 may include an RJ45 port or similar port for wired communication with the network. In another implementation, the communication unit 208 may include a wireless transceiver (not shown) for exchanging data with the network or any other communication channel using one or more wireless communication methods, such as IEEE 802.11, IEEE 802.16, Bluetooth® or another suitable wireless communication method. In still another implementation, the communication unit 208 may include a wired port and a wireless transceiver. The communication unit 208 also provides other connections to the network for distribution of files and/or media objects using standard network protocols such as TCP/IP, HTTP, HTTPS, and SMTP as will be understood to those skilled in the art.

Figure 3:
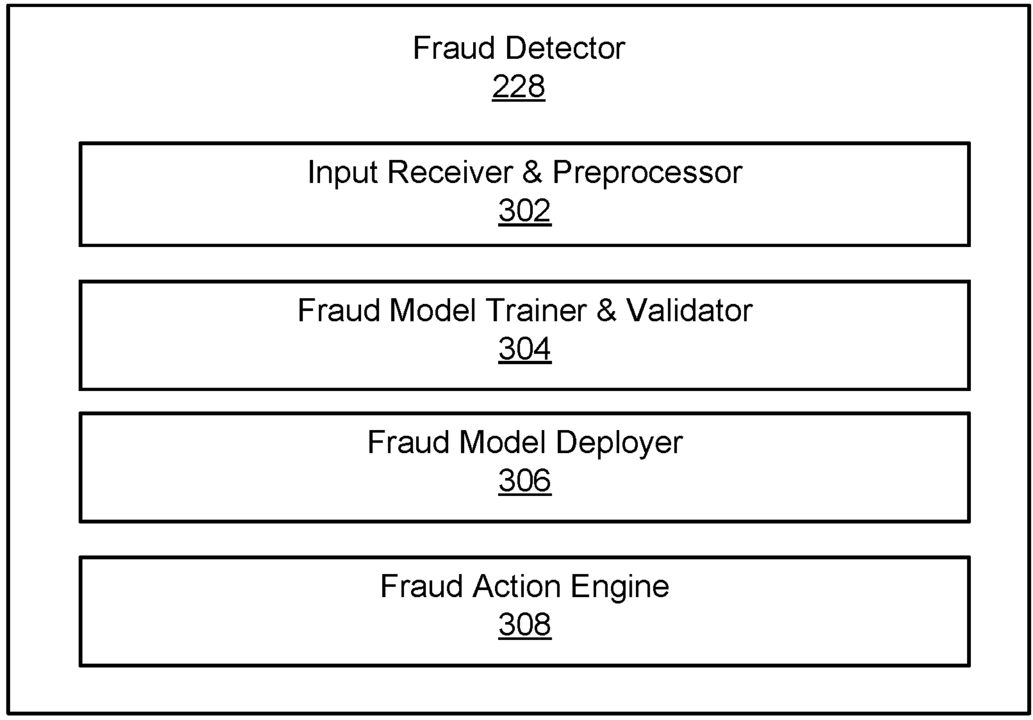
FIG. 3 is a block diagram of an example fraud detector in accordance with some implementations.

Referring now to FIG. 3, a block diagram of an example of a fraud detector 228 is illustrated in accordance with one implementation. In this example AI/ML components are illustrated at a high level of abstraction for implementing models for generating and applying an aggregate fraud score. As illustrated in FIG. 3, the fraud detector 228 may include an input receiver and preprocessor 302 to receive input signals indicative of potential fraud and perform any pre-processing of input signals. A model trainer and validator unit 304 may train and validate the machine learning models that are used. A model deployer 306 implements model deployment. Action engine 308 determines actions for identity verification checks (e.g., accept, reject, flag for agent review).

Figure 4A:
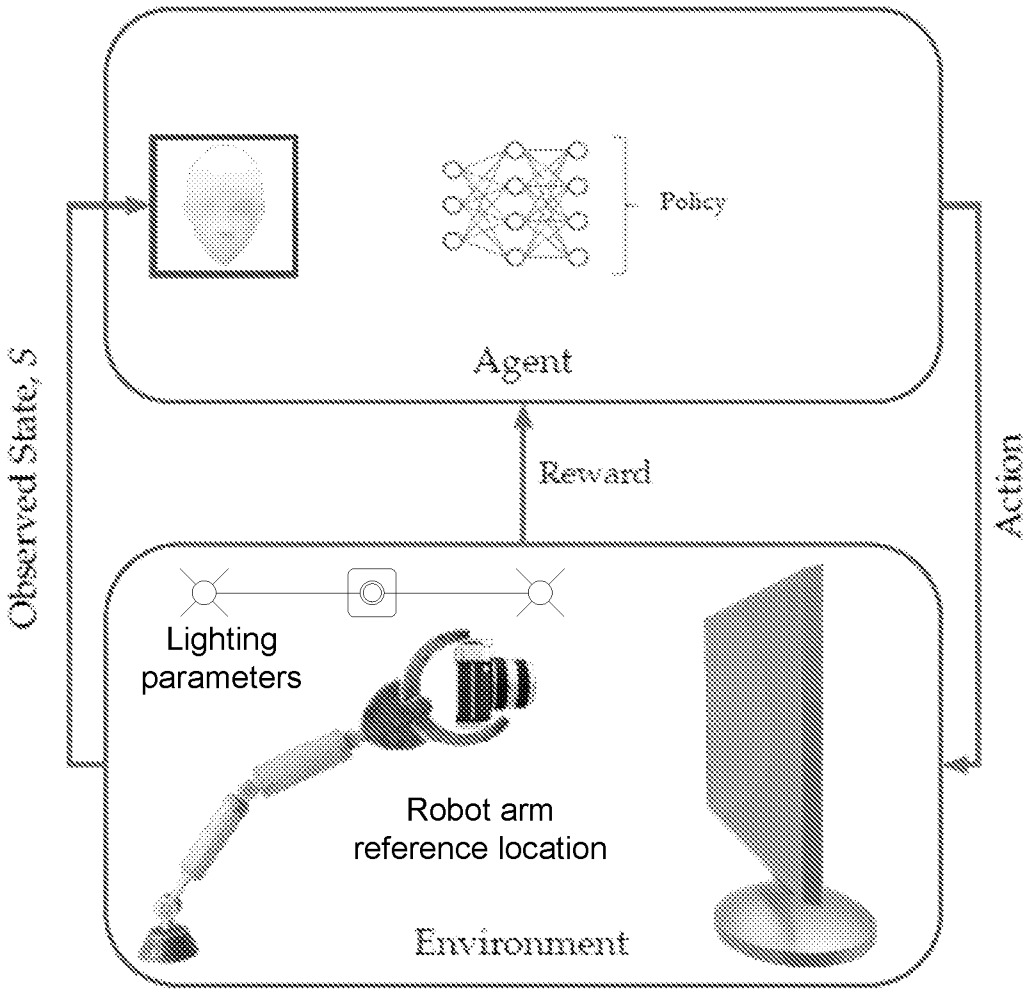
FIG. 4A illustrates an example of a spoof agent learning to spoof using images or videos present on a computer screen in accordance with an implementation.
Figure 4B:
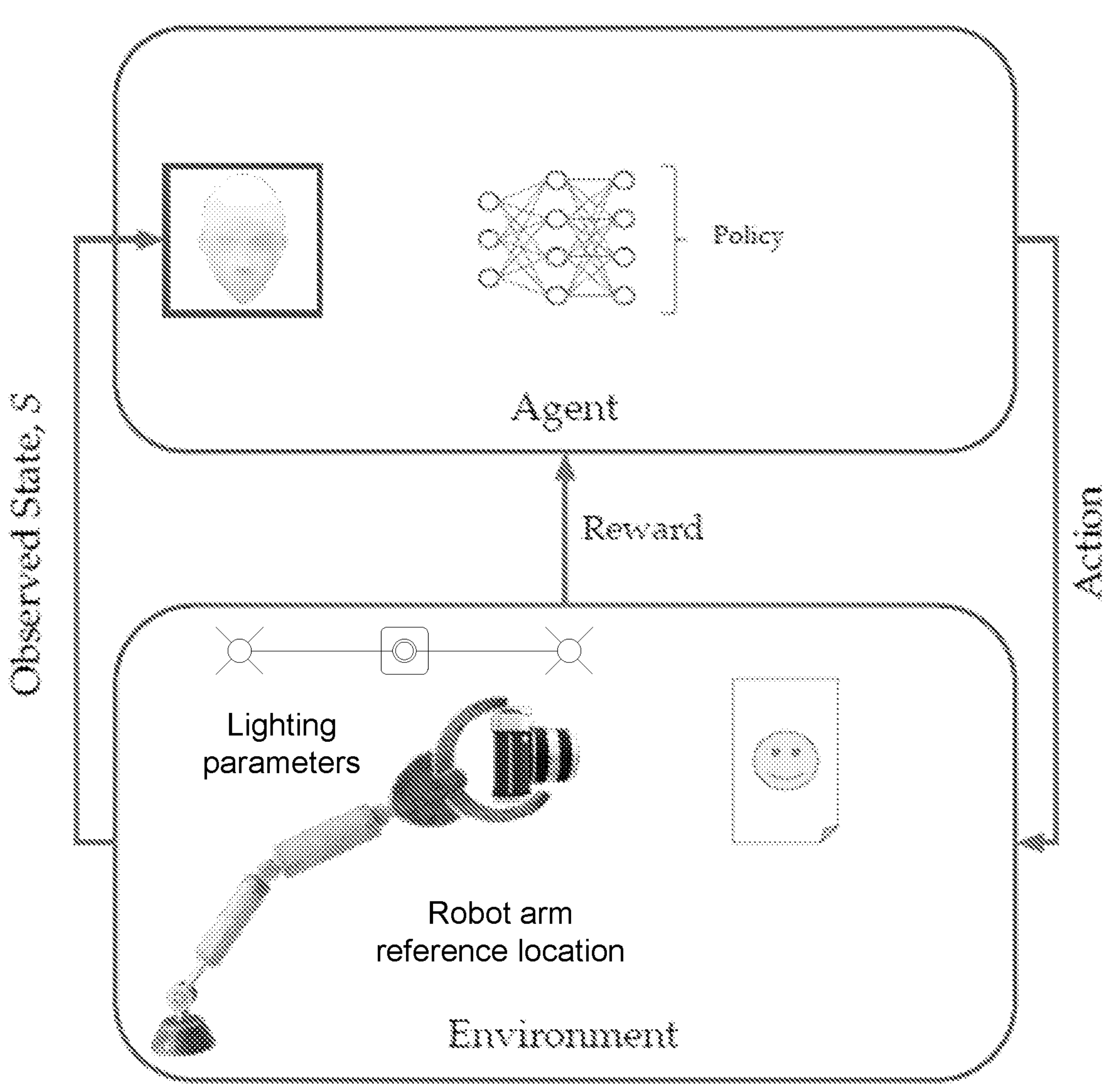
FIG. 4B illustrates an example of a spoof agent learning to spoof using images printed on a paper in accordance with an implementation.
Figure 4C:
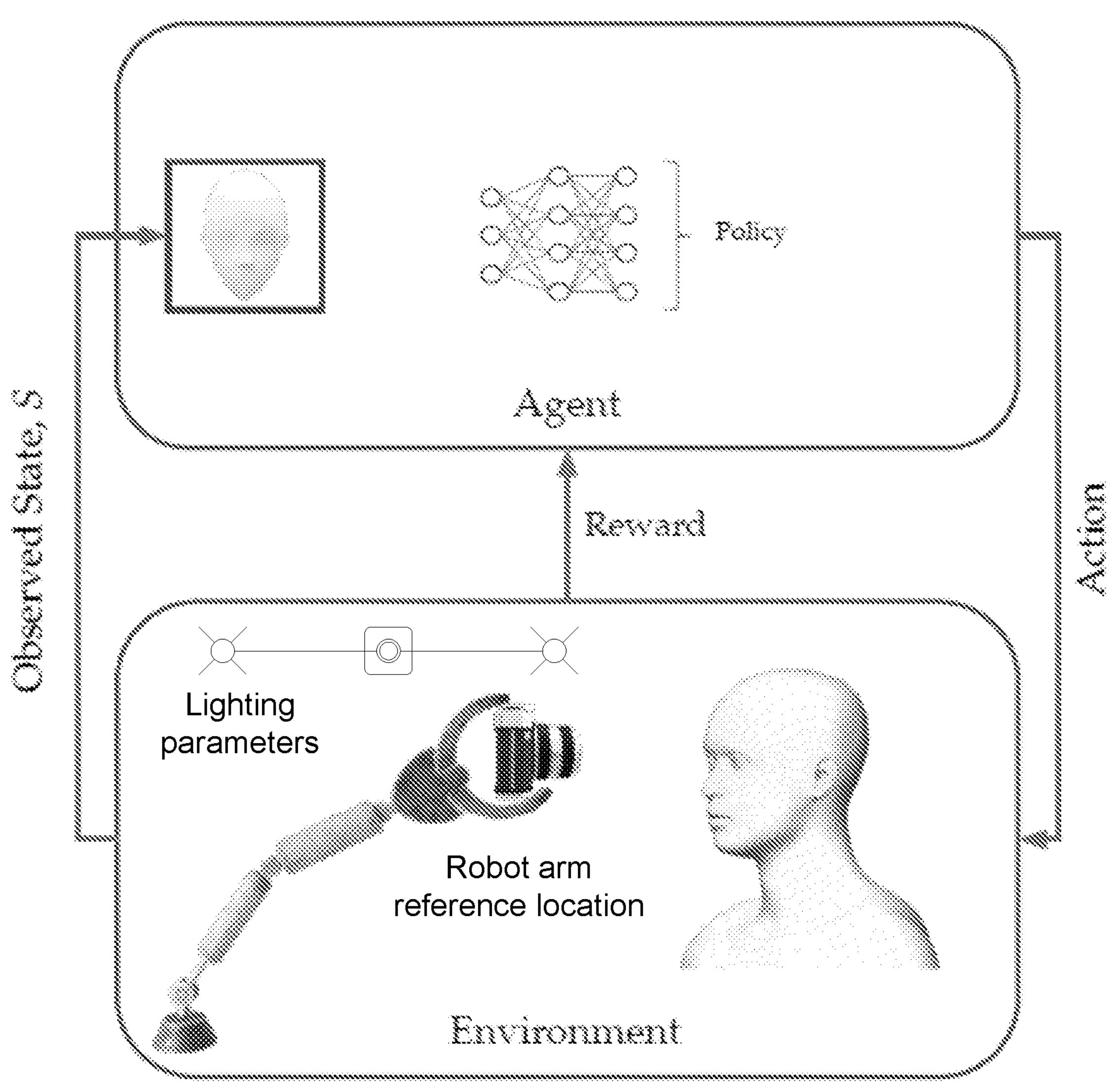
FIG. 4C illustrates an example of a spoof agent learning to spoof using a 3D printed face in accordance with an implementation.

FIGS. 4A, 4B, and 4C illustrate some aspects of example implementations, from the perspective of the spoof agent. FIG. 4A illustrating an example in which the simulated attempted spoof attacks are based on capturing images from a display screen, using different robotic arm locations and lighting parameters. The spoof agent determines the action that is selected to be performed, such as varying the location of the robotic arm and the lighting conditions. There is monitoring of the actions based on the Observed State, S (e.g., whether simulated spoofing attacks fooled the spoof detector). FIG. 4A also illustrates how the spoof agent also performs reinforcement learning based on a reward for successful fooling the spoof detector. FIG. 4B illustrates an example in which the spoofing is based on capturing images of paper images. FIG. 5C illustrates an example in which the spoofing is based on captured 3D images.

Flow Chart Examples

Figure 5:
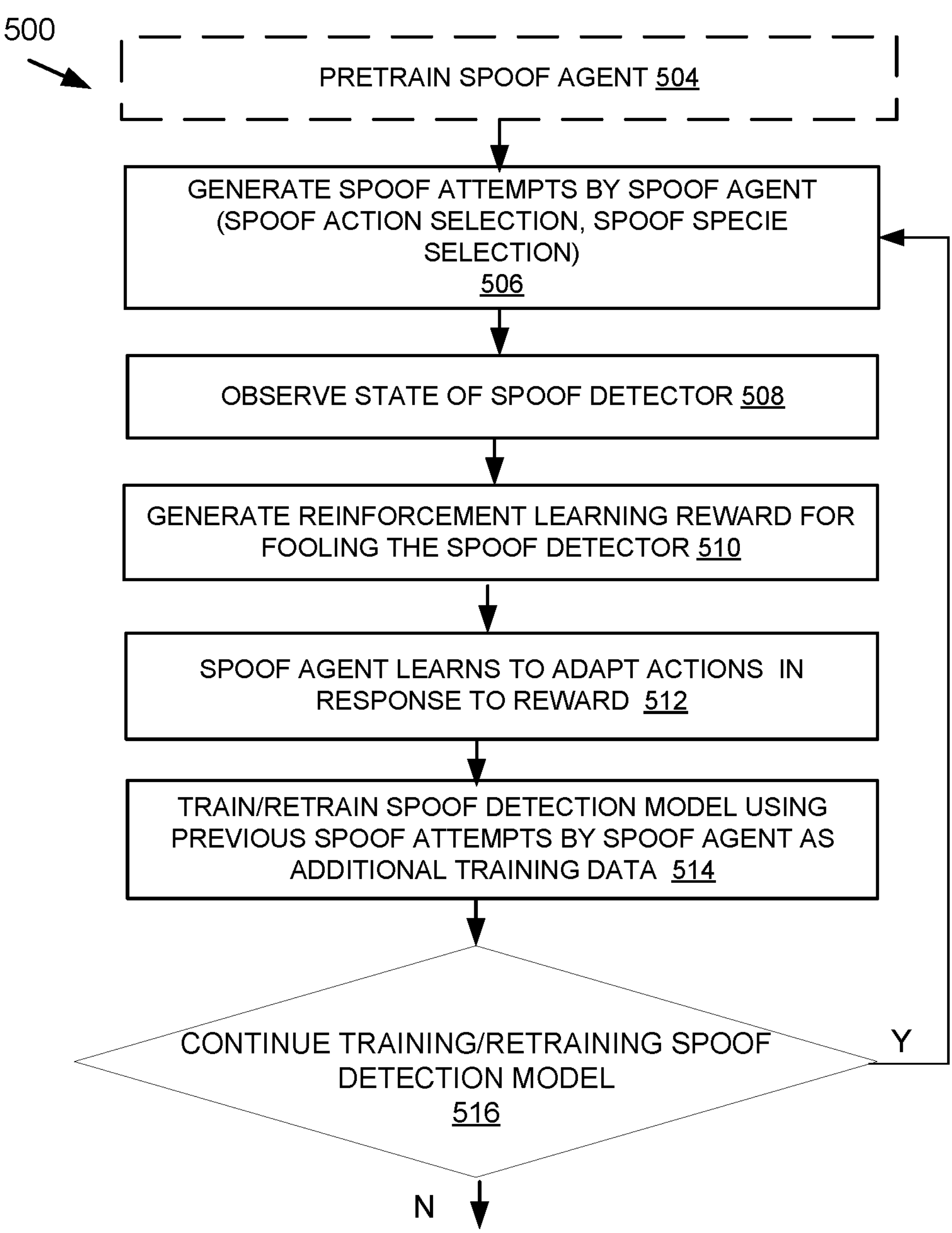
FIG. 5 is a flowchart of general example method of using reinforcement learning to generate improved training data for spoof detection in accordance with some implementations.

FIG. 5 is a flowchart illustrating a general example method 500 of iteratively performing reinforcement learning of the spoof agent. As illustrated in block 504, in some implementations the spoof agent is pretrained. In block 506, the spoof agent generates simulated attempted spoof attacks, the results of which are used as training data for a spoof detector. In block 508, the state of the spoof detector is observed to determine which attempted spoof attacks were successful spoofing attempts and which spoofing attempts failed at fooling the spoof detector. In block 510, a reinforcement learning reward is generated for spoofing attacks that fooled the spoof detector. In block 512, the spoof agent learns to adapt in response to the reward. In block 514, the spoof detection model is retrained based at least in part on the results of the previous spoof attempts by the spoof agent. That is, the results of the previous simulated spoof attempts is an additional source of training data in addition to whatever reference training data is available. In block 516, a decision is made whether to continue training/retraining the spoof detection model. If yes, then, the spoof detection model is retrained in and the process loops back to block 506. A variety of different criteria could be implemented to determine how many times the cycle repeats. However, by having the cycle repeat, the spoof agent learns and can learn to become better at spoofing the spoof detector. That in turn means that the spoof detector can be retrained to become better at handling edge cases. In one implementation, at least two cycles are utilized corresponding to at least one instance in which the spoof agent learns to improve its spoofing and the spoof detector is retrained based at least in part on the simulated spoof attacks of the spoof agent.

Figure 6:
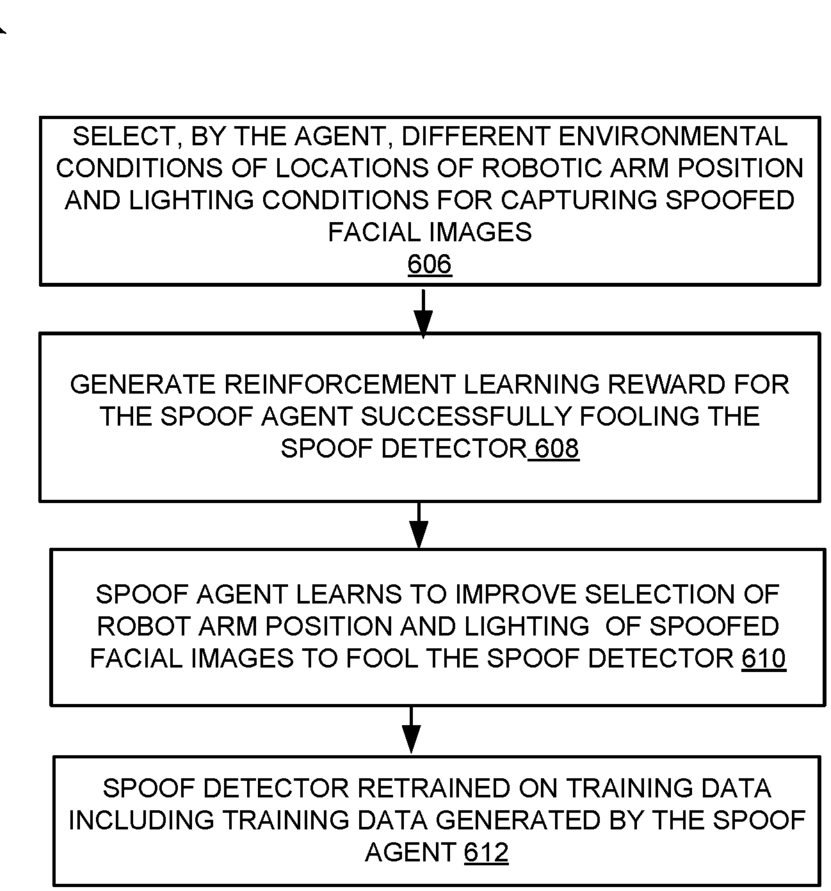
FIG. 6 is a flowchart of an example method for spoofed facial images in accordance with some implementations.

FIG. 6 is a flow chart of an example method 600 for facial images. In block 606, the spoof agent selects environmental conditions for capturing facial images, such as the location of the robotic arm and the lighting conditions. In block 608, reinforcement learning is used by the spoof agent to learn successfully fooling the spoof detector in one or more simulated spoof attack attempts. In block 610, the spoof agent learns to improve selection of the robotic arm position and lighting of spoofed facial images to fool the spoof detector. In block 612 the spoof detector is retrained on training data, including training data generated based on the results of previous spoof attempts (e.g., spoof attacks that succeeded in fooling the spoof detection model, but more generally both successful and unsuccessful simulated attempted spoofing attacks). As previously discussed, the process may optionally be looped and repeated.

Figure 7:
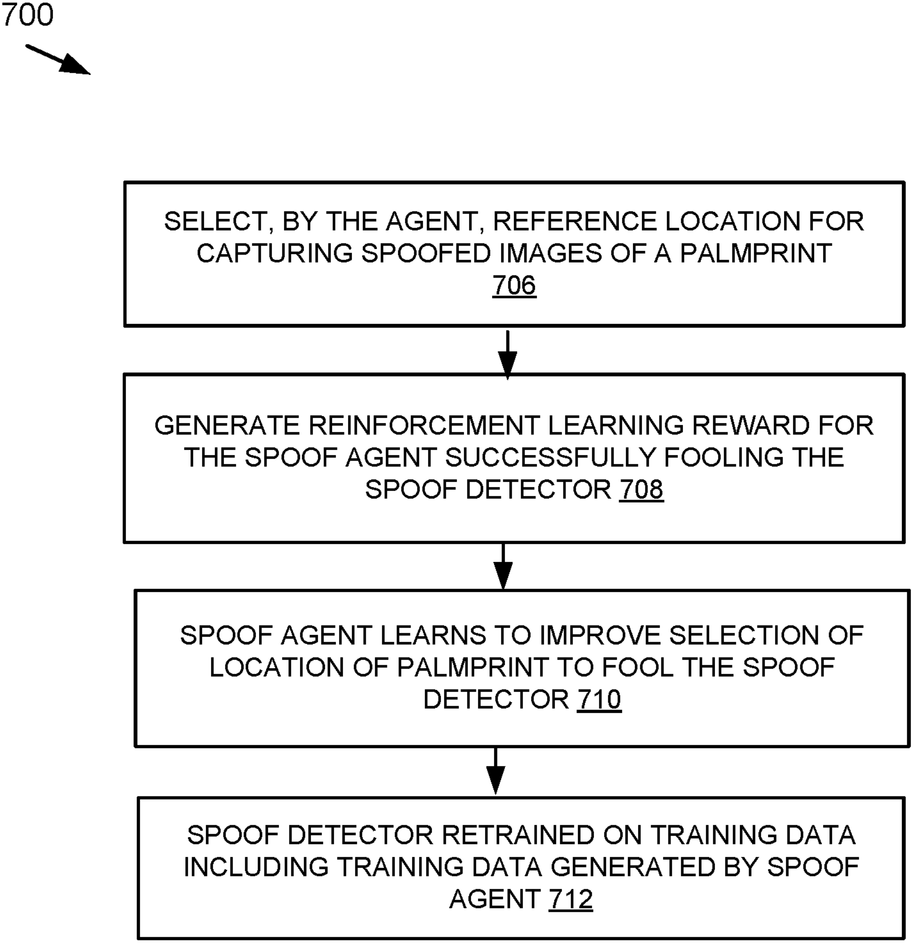
FIG. 7 is a flowchart of an example method for spoofed palmprints in accordance with some implementations.

FIG. 7 is a flow chart of an example method 700 for palmprints. In block 706, the agent selects the reference locations for capturing spoofed images of palmprints used in a simulated attempted spoofing attack. In block 708, a reinforcement learning reward is generated for the spoof agent successfully fooling the spoof detector in one or more spoof attempts. In block 710, the spoof agent learns to improve its selection of the location at which the captured palmprint is used to fool the spoof detector. In block 712, the spoof detector is retrained on training data, including training data generated based on the results of previous spoof attempts. As previously discussed, the process may optionally be looped and repeated.

Figure 8:
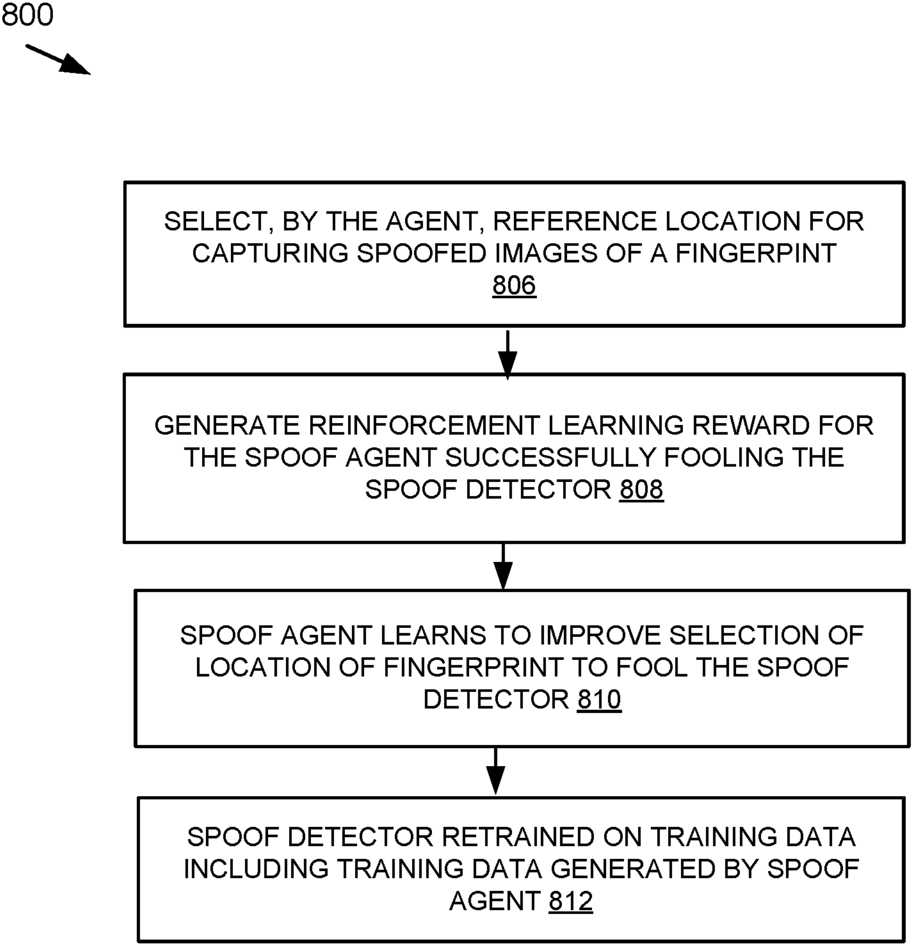
FIG. 8 is a flowchart of an example method for spoofed fingerprints in accordance with some implementations.

FIG. 8. Is a flow chart of an example method 800 for fingerprints. In block 806, the agent selects reference locations for capturing spoofed images of fingerprints. In block 808, a reinforcement learning reward is generated for the spoof agent successfully fooling the spoof detector. In block 810, the spoof agent learns to improve its selection of the location at which the captured fingerprint is used to fool the spoof detector. In block 812, the spoof detector is retrained on training data, including training data generated based on the results of previous spoof attempts. As previously discussed, the process may optionally be looped and repeated.

Figure 9:
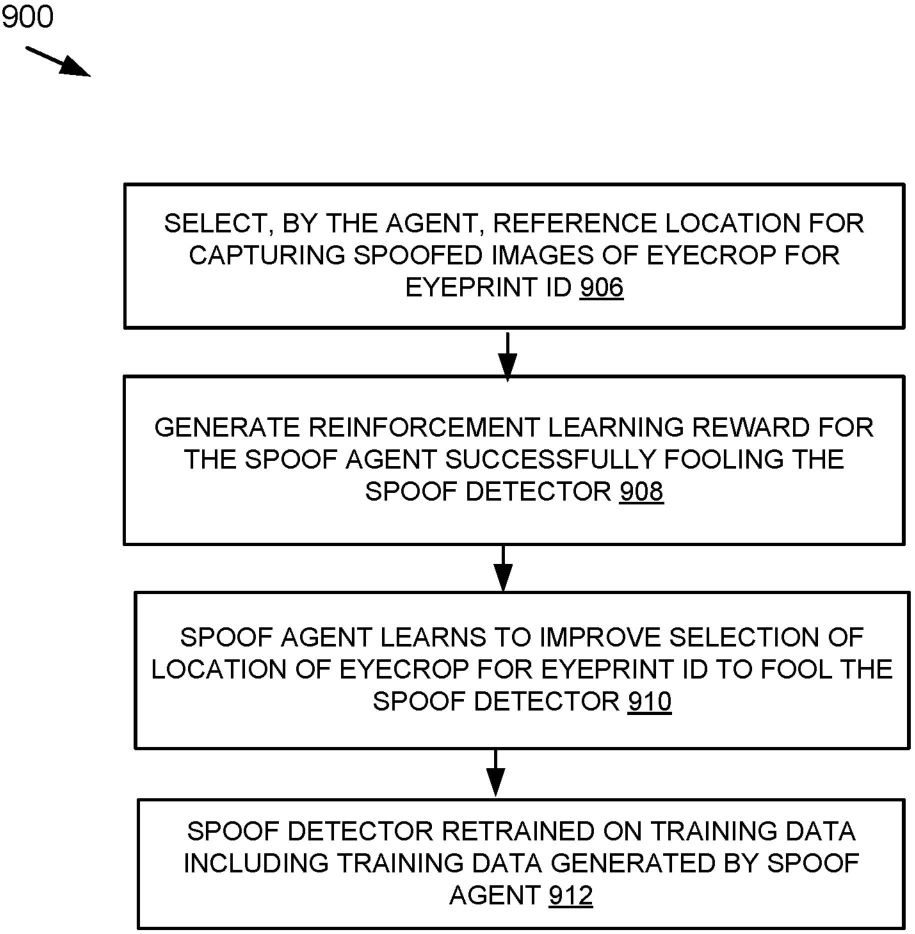
FIG. 9 is a flowchart of an example method for spoofed eyeprints in accordance with some implementations.

FIG. 9 is a flow chart of an example method 900 for eyeprints. In block 906, the agent selects locations for capturing spoofed images of eyecrops used for eyeprints. In block 908, a reinforcement learning reward is generated for the spoof agent successfully fooling the spoof detector. In block 910, the spoof agent learns to improve its selection of the location at which the captured eyecrops are used to fool the spoof detector. In block 912, the spoof detector is retrained on training data, including training data generated based on previous spoof attempts. As previously discussed, the process may optionally be looped and repeated.

Figure 10:
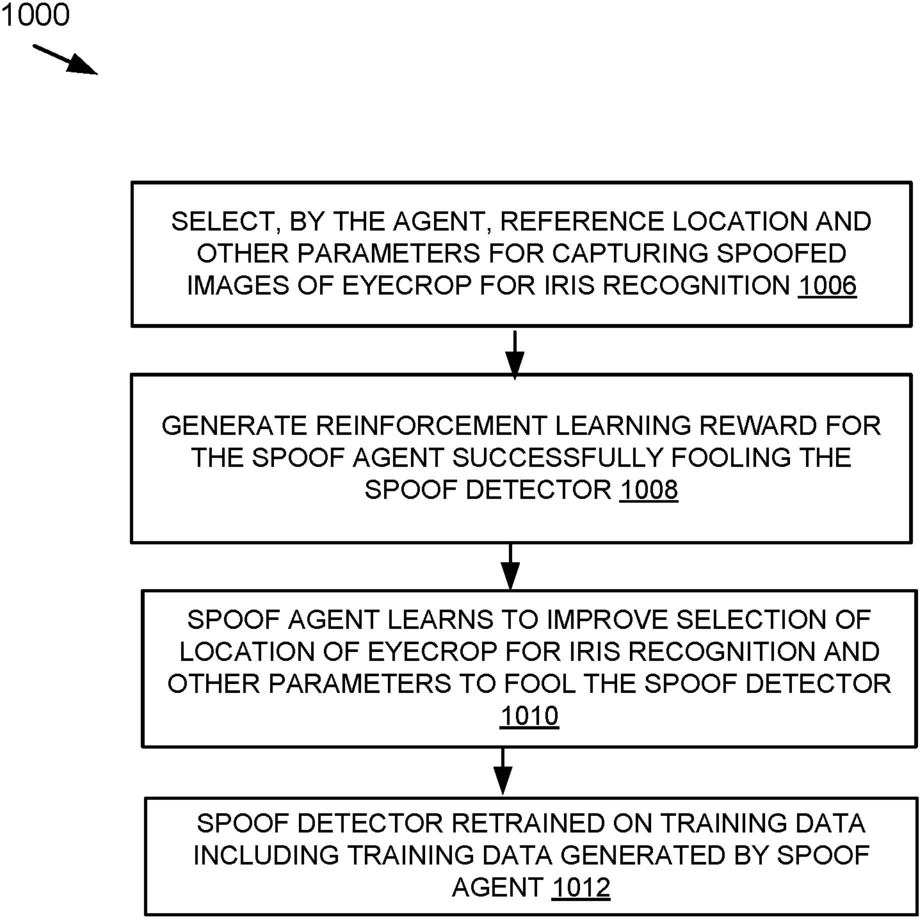
FIG. 10 is a flowchart of an example method for spoofed iris in accordance with some implementations.

FIG. 10 is a flow chart of an example method 1000 for iris recognition. In block 1006, the agent selects locations for capturing spoofed images of eyecrops used for iris recognition. In block 1008, a reinforcement learning reward is generated for the spoof agent successfully fooling the spoof detector. In block 1010, the spoof agent learns to improve its selection of the location at which the captured eyecrops are used to fool the spoof detector. In block 1012, the spoof detector is retrained on training data, including training data based on the results of previous spoof attempts. As previously discussed, the process may optionally be looped and repeated.

OTHER CONSIDERATIONS

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer system for training a spoof detector to detect spoofing attacks, comprising:

at least one computing unit having a processor and a memory, the computer system including computer program instructions to implement:

a spoof detection machine learning model;

a spoof agent;

the spoof detection machine learning model trained to detect spoof attempts of faces based at least in part on training data generated by the spoof agent, the spoof agent having a reinforcement learning model in which the spoof agent is rewarded for generating simulated attempted spoofing attacks of faces that fool the spoof detection machine learning model, wherein the spoof detection machine learning model is trained iteratively with the spoof agent utilizing reinforcement learning to improve its ability to train the spoof detection machine learning model;

wherein the spoof agent controls a 6 degrees of freedom robotic arm holding a camera to select an x, y, z, roll, pitch, and yaw of spoofed facial images captured by the camera in the simulated attempted spoofing attacks of faces;

wherein the spoof agent controls lighting parameters of spoofed facial images captured by the camera in the simulated attempted spoofing attacks of faces, including controlling a number of lights used, a position and direction of lights used, a color spectrum of lights used, and an intensity of lights used;

wherein the spoof agent selects samples of facial images and gets N attempts to spoof a given sample, where N is a number selected to control a size of an action space;

wherein an additional agent is used to select a subgroup of samples to attempt to exploit at least one potential bias of the spoof detector for detecting identity spoofing, including at least one of gender, ethnic group, skin tone, and age group; and wherein the spoof detection machine learning model is trained to detect spoofing attacks in biometric identity verification.

2. The computer system of claim 1, wherein the spoof detection machine learning model comprises a neural network model.

3. The computer system of claim 1, wherein the spoof agent controls at least one camera parameter of spoofed facial images captured by the camera in the simulated spoofing attacks of faces, wherein the at least one camera parameter is selected from the group consisting of an exposure setting, shutter speed setting, f-stop setting, and ISO setting.

4. The computer system of claim 1, wherein the simulated attempted spoofing attacks of faces are based on at least one of paper-based attacks of faces, screen-based spoof attacks of faces, and three-dimensional spoof attacks of faces.

5. The computer system of claim 1, further comprising pre-training the spoof agent.

6. A method of biometric authentication, comprising:

receiving facial images for biometric identity verification; and performing biometric authentication of facial images using a spoof detector having a spoof detection machine learning model;

wherein the spoof detection machine learning model is trained to detect spoof attempts of faces based at least in part on training data generated by a spoof agent, the spoof agent having a reinforcement learning model in which the spoof agent is rewarded for generating simulated attempted spoofing attacks of faces that fool the spoof detection machine learning model, wherein the spoof detection machine learning model is trained iteratively with the spoof agent utilizing reinforcement learning to improve its ability to train the spoof detection machine learning model;

wherein the spoof agent controls a 6 degrees of freedom robotic arm holding a camera to select an x, y, z, roll, pitch, and yaw of spoofed facial images captured by the camera in the simulated spoofing attacks of faces;

wherein the spoof agent controls lighting parameters of spoofed facial images captured by the camera in the simulated spoofing attacks of faces, including controlling a number of lights used, a position and direction of lights used, a color spectrum of lights used, and an intensity of lights used;

wherein the spoof agent selects samples of facial images and gets N attempts to spoof a given sample, where N is a number selected to control a size of an action space; and wherein an additional agent is used to select a subgroup of samples to attempt to exploit at least one potential bias of the spoof detector for detecting identity spoofing, including at least one of gender, ethnic group, skin tone, and age group.

7. The method of claim 6, wherein the spoof detection machine learning model comprises a neural network model.

8. The method of claim 6, further comprising the spoof agent controlling at least one camera parameter of spoofed facial images captured by the camera in the simulated spoofing attacks of faces, wherein the at least one camera parameter is selected from the group consisting of an exposure setting, shutter speed setting, f-stop setting, and ISO setting.

9. The method of claim 6, wherein the simulated attempted spoofing attacks of faces are based on at least one of paper-based attacks of faces, screen-based spoof attacks of faces, and three-dimensional spoof attacks of faces.

10. The method of claim 6, further comprising pre-training the spoof agent.

11. A method of generating training data for a spoof detector, comprising:

generating, by a spoof agent, simulated attempted spoof attacks of biometric facial images targeted at a spoof detection model;

controlling, by the spoof agent, a 6 degrees of freedom robotic arm holding a camera to select an x, y, z, roll, pitch, and yaw of spoofed biometric facial images captured by a camera as part of a simulated attempted spoof attack;

controlling, by the spoof agent, lighting parameters of spoofed facial images captured by the camera in the simulated spoofing attacks of faces, including controlling a number of lights used, a position and direction of lights used, a color spectrum of lights used, and an intensity of lights used;

selecting samples, by the spoof agent, of facial images in which the spoof agent gets N attempts to spoof a given sample, where N is a number selected to control a size of an action space;

selecting samples, by an additional agent, to attempt to exploit at least one potential bias of the spoof detector for detecting biometric images including at least one of gender, ethnic group, skin tone and age group;

identifying successful and unsuccessful simulated spoof attacks of biometric facial images by the spoof detection model;

generating a reinforcement learning reward for the spoof agent successfully fooling the spoof detection machine learning model, whereby the spoof agent learns to adapt its spoof attempts; and utilizing results of the simulated attempted spoof attacks as the source of training data for the spoof detection machine learning model to detect spoofing attacks in biometric identity verification.

12. The method of claim 11, wherein the spoof detection machine learning model comprises a neural network model.

13. The method of claim 11, wherein the spoof agent comprises a neural network model.

14. The method of claim 11, wherein the generating simulated spoof attack attempts includes selecting at least one action for capturing spoofed images and/or videos.

15. The method of claim 11, wherein the at least one action comprises selecting a location for capturing an image and/or video.

16. The method of claim 11, wherein the reference location is selected for a robotic arm with respect to a camera used to capture images and/or videos.

17. The method of claim 11, wherein the at least one action comprises selecting a lighting condition and at least one camera parameter selected from the group consisting of an exposure setting, shutter speed setting, f-stop setting, and ISO setting.

18. The method of claim 11, wherein the simulated attempted spoof attacks are based on at least one of paper-based attacks, screen-based spoof attacks, and three-dimensional spoof attacks.

19. The method of claim 11, further comprising selecting at least one sample selection rule by the spoof agent.

20. The method of claim 11, further comprising pre-training the spoof agent.

* * * * *